United States Patent [19]

Foster

[11] Patent Number: 5,542,451

[45] Date of Patent: *Aug. 6, 1996

[54] WATER DISTRIBUTION DEVICE

[76] Inventor: Joseph E. Foster, 64 N. 12th St., Harrisburg, Pa. 17103

[*] Notice: The term of this patent shall not extend beyond the expiration date of Pat. No. 5,366,618.

[21] Appl. No.: 338,641

[22] Filed: Nov. 10, 1994

Related U.S. Application Data

[63] Continuation-in-part of Ser. No. 950,400, Sep. 23, 1992, Pat. No. 5,366,618.

[51] Int. Cl.⁶ .................................................. F16K 11/02
[52] U.S. Cl. ............................. 137/625.11; 137/625.21; 210/169; 210/416.2; 210/417; 119/259
[58] Field of Search ..................... 137/625.11, 625.21; 210/169, 416.2, 417; 119/259

[56] References Cited

U.S. PATENT DOCUMENTS

| | | | |
|---|---|---|---|
| 923,160 | 6/1909 | Fleming | 137/625.21 |
| 2,477,590 | 8/1949 | Ferwerda et al. | 137/625.21 |
| 2,696,800 | 12/1954 | Rork | 210/169 |
| 3,092,073 | 6/1963 | Conde | 137/625.21 X |
| 3,468,288 | 9/1969 | Cassil | 210/169 |
| 3,524,472 | 8/1970 | Faisandier | 137/625.21 |
| 3,713,462 | 1/1973 | Bushee | 137/625.21 |
| 3,948,286 | 4/1976 | Dunbar et al. | 137/625.21 X |
| 4,632,148 | 12/1986 | Stark, Sr. et al. | 137/625.21 X |
| 4,728,420 | 3/1988 | Abercia, Jr. | 210/169 |
| 5,366,618 | 11/1994 | Foster | 210/138 |

*Primary Examiner*—John Rivell
*Attorney, Agent, or Firm*—John V. Silverio

[57] ABSTRACT

A water distributor for distributing a flow of water to at least one of a plurality of output ports. The particular output port(s) chosen varies as a function of time and depends on the position of a motor driven rotor within the distributor. In another embodiment of the invention the distributor distributes water to at least one of a plurality of nozzles and draws water through at least one of the same plurality of nozzles. Other ones of the plurality of nozzles are neither outputting nor drawing in water. The function of a particular nozzle is dependent on the position of a rotor within the distributor. The rotor is motor driven whereby the function of a particular nozzle changes as a function of time as the rotor rotates. Each distributor of the invention is particularly adaptable for coupling to a fluid filled tank to provide time varying currents and eddies. The distributors thus provide a varying flow of water to a tank to disperse pollutants and contaminants and provide oxygen to the water.

11 Claims, 8 Drawing Sheets

WATER DISTRIBUTION DEVICE

This application is a continuation-in-part of application Ser. No. 07/950,400, filed on Sep. 23, 1992, now U.S. Pat. No. 5,366,618.

BACKGROUND OF THE INVENTION

1. Field of the Invention

This invention relates to devices for distributing water between one or more sources and one or more destinations so that the source/destination coupling varies over time. In particular the invention relates to a device for distributing a flow of water between one or more sources and one or more destinations coupled to an aquarium. The specific coupling is changed in time varying manner, to produce currents in the aquarium which change over time. These currents prevent water stagnation, improve oxygenation and otherwise maintain aquarium health. The currents also are of interest to the aquarium occupants.

2. Prior Art

Fluid valves and similar distribution devices are used in various situations for selective direction of fluids, especially water. For example, valves and distribution devices can effect delivery of fluid from a common source to a variety of distinct locations by suitable coupling of particular conduits among a plurality of alternative conduits. A limited number of sources of fluid thus permit distribution of fluid to a larger number of locations in need of supply, and alternative connections of particular sources and destinations are made possible.

Valves and distribution devices for liquid range from simple faucets, gate valves and the like, as typically found in family homes, to complicated systems which may have industrial application. The following are some examples of multi-port and multi-position valve structures.

U.S. Pat. No. 2,741,265—Poor discloses a fluid control and distribution unit having two plates. One plate has a plurality of apertures; the other has arcuate grooves. The rotation of one plate with respect to the other sequentially opens and closes coupling of the apertures to the grooves by causing them to align or misalign.

U.S. Pat. No. 3,334,658—Kaatz discloses a selector valve for fluid distribution. The valve has a common inlet port and a plurality of selectable outlet ports. The outlet ports have check valves which are spring biased closed and are openable by rotating a manual operator having protrusions which engage a selected one of the check valves to couple that outlet port to the inlet, allowing the user to manually select which outlet port is connected to the inlet port.

U.S. Pat. No. 3,463,193—Yost discloses a slide valve operable to open and close an opening in a casing wall.

U.S. Pat. No. 3,508,582—Aulisa discloses a selective coupling apparatus. A rotor inside a casing successfully couples a plurality of inlets to a single outlet.

U.S. Pat. No. 3,837,360—Bubula discloses a fluid selector valve having a rotatable plate disposed in a chamber, a first port and a plurality of additional ports. The additional ports are selectably operable by manually rotating the plate through control means extending externally of the housing.

U.S. Pat. No. 4,224,958—Kaplan, et al discloses a valve having inner and outer plates having communicating openings and a middle plate rotatable to selectively open or close the openings. The present invention concerns an automatic valve arrangement which is especially adapted for use with an aquarium. Aquariums are a source of aesthetic beauty for home interiors and the like. Aquariums provide knowledge and first hand experience of aquatic life, which is especially valuable to children in early stages of learning about plants and animals that share the earth. Home aquariums are available in a variety of sizes, shapes and types. For example, home aquariums can be set-up to support fresh water or salt water fish, of both tropical and temperate species.

Aquarium maintenance is a major concern. A dirty or neglected tank system is not only ugly but the state of the microenvironment in the aquarium can degrade to the point that the fish cannot survive. A dirty tank can produce toxins, bacteria or algae which rob the water of the dissolved oxygen necessary for the survival of the fish. The level of wastes and toxins can become high enough to exceed the capacity of aquarium occupants intended to process wastes from other occupants (e.g., snails, catfish, etc.). Fresh water tank maintenance is relatively easy compared to maintenance of a salt water tank. A salt water aquarium must be tended almost daily to maintain salinity levels, ph and other parameters. If such parameters are not maintained within certain levels the occupants of the tank will die.

Aquarium filtering technology is continuously advancing. However, the best available filtering devices cannot equal the self-cleansing actions of natural water bodies such as lakes, streams, rivers, bays and oceans. Furthermore, such filtering devices also require substantial and regular maintenance. Natural phenomenon which function to clean and oxygenate bodies of water, such as evaporation, rain storms, tides and currents, are simply more effective, particularly because the fish and the like have evolved to survive under such conditions.

Presently known filtering apparatus include undergravel filters, used alone or in conjunction with other filters. In an undergravel filter arrangement, water is drawn downwardly through a layer of gravel placed over a plenum on the aquarium bottom. The gravel is the filtering media for cleaning the water of impurities, housing and oxygenating bacteria which break down and neutralize organic contaminants.

Other filters include external filters having pumps for pulling aquarium water from the tank and through a filter medium. The filters usually contain cotton, cloth, fiberglass and/or diatomaceous earth for filtering the water of dirt and particulate matter. The filters also usually contain activated charcoal or carbon for further purification and odor removal. Diatomaceous earth, charcoal and other forms of biological filters provide a large surface area for collecting contaminants, and provide a surface for supporting bacteria to break down toxins.

Another type of filtering system is known as a protein skimmer. A protein skimmer provides bubbles to the aquarium water. The bubbles attract contaminants as they flow up through the water. The contaminant-carrying bubbles are then scooped off and removed.

Oxygenating means are required to provide dissolved oxygen to support fish life. The oxygenating means can be part of a filtering device or can be provided separately. Typically, an air pump is coupled to an air stone for providing a large quantity of small air bubbles to the tank water. The relatively large surface area of numerous small air bubbles in contact with the water improves the likelihood that oxygen will dissolve in the water. In certain undergravel filter systems, bubbles are released into standing tubes coupled to the under-gravel plenum, whereby rising bubbles in the tubes produce a current of water downwardly through the gravel and upwardly through the tubes. These and other devices which cause water movement in the aquarium increase the likelihood that oxygen will dissolve in the water, at least because more of the water is passed along the surface than in an arrangement where the water is wholly stagnant.

Other types of aquarium water cleaners/purifiers include that of U.S. Pat. No. 2,696,800—Rork. Rork discloses an aquarium for keeping live lobsters and the like. A rotating fluid bailing wheel having a plurality of radially extending channels or conduits scoops water from an auxiliary chamber in the aquarium. The channels terminate in the hub of the bailing wheel. The water scooped by the channels drains out the hub of the wheel into the primary tank. In this manner, water is kept moving and aerated within the tank.

U.S. Pat. No. 3,468,288—Cassil discloses an aquarium conditioner. The conditioner uses a pump to remove water from an aquarium and deliver it to a multi-chambered conditioning unit which adjusts the water's temperature and also cleans the water.

U.S. Pat. No. 4,728,420—Abercia, Jr. discloses an aquarium having a fixture for carrying multiple conduits through the aquarium wall. The conduits include ones for transporting air to aerators in the aquarium and also at least one for transporting water to or from the aquarium.

SUMMARY OF THE INVENTION

It is a general object of the invention to provide a fluid distribution device for automatically selectively coupling a fluid source to one or more ports in a manner that varies as a function of time.

It is another object of the invention to provide a fluid distribution device for selectively coupling a main fluid source conduit to one or more of a plurality of secondary input ports, the specific coupling varying as a function of time, and simultaneously selectively coupling a plurality of secondary fluid outlet sinks to a main outlet conduit as a function of time.

It is a further object of the invention to provide fluid distribution to an aquarium set-up to provide time varying water currents within the aquarium.

These and other objects are accomplished by a distributor having one or more inputs and a plurality of outputs. One or more, but less than all, of the outputs communicate with an input at a given time, and the coupling of is varied over time, regularly, randomly or intermittently, so as to change the orientation and perhaps the direction of flow. Communication between with the output ports preferably is controlled by a rotating, essentially semi-circular rotor within a chamber of the distributor. As the rotor rotates as a function of time, various outputs are opened and closed depending on whether the rotor is blocking the output at the time. The rotor is preferably rotated by a motor driven shaft, and preferably at a low speed, for example, ten revolutions per minute (RPM) or lower, thereby changing the coupling arrangement on a regular basis.

The output ports are connected by piping or tubing to various locations or devices which are advantageously provided with a time varying fluid supply or return arrangement. For example, a varying supply can be provided to sprinklers in a farm field such that a subset of all the sprinklers operates at a given time, and the subset is changed automatically by operation of the device. In a preferred use, tubes connect each of the outputs to spaced apertures in an aquarium side or bottom to provide time-varying currents within the aquarium between automatically selected inlets and/or outlets. For example, water input to the valve, preferably drawn from the aquarium itself by a pump, is directed to the rotating valve. Water is delivered to the aquarium apertures through the output ports presently communicating with the input to the distributor. As the rotor rotates as a function of time, new outputs become opened, thereby communicating with the distributor input over a water current path through the aquarium over a different path as new outputs open and previously opened outputs close. In this manner, the apertures which are providing water to the aquarium activate and deactivate as a function of time to provide time varying currents to the aquarium.

Of course the invention is applicable to flow in either direction, and it is possible to provide an arrangement where the direction of currents is reversed by operation of the device. Accordingly, the designation of an "input" or "output" according to the invention does not preclude the possibility of an inlet or outlet respectively being coupled to the pressure side or the suction side of a flow driving device such as a water pump.

In another embodiment of the fluid control means, the rotating rotor of the rotary valve has a cut-out section to provide a dual function distribution device. Secondary apertures of the rotor communicate with a main fluid supply held, for example, in a tank. Fluid is drawn from the main supply and input to a main input of the distributor. The fluid is then distributed through apertures communicating with the main input, i.e. not blocked by the rotor or within the cut-out section.

Other apertures reside within the cut-out of the rotor. These apertures communicate with a drawing conduit. Suction means on the drawing conduit pull fluid through the apertures in communication with the drawing conduit, i.e. the apertures residing within the cut-out. As the rotor rotates, preferably driven by a motorized shaft, various ones of the apertures fall within the rotor cut-outs or out of the rotor cut-out. When this happens, the functions of the apertures change from input to output and vice versa. The rotor can have wing portions which block certain apertures at a given time as the rotor rotates. Blocked apertures neither draw water nor distribute water. Thus, a number of flow arrangements are possible and the device cycles slowly through different combinations to provide changes in current patterns through the volume of water in an aquarium or the like.

The pumping or drawing fluid control device mentioned above can be interfaced with an aquarium to provide the aquarium with time-varying currents. For example, the apertures on the valve can be coupled via tubing to apertures in an aquarium wall or floor, or to tubes which open at different elevations and/or at different X-Y positions throughout the volume of water. As the rotor rotates, various apertures alternately draw water, pump water or become inactive. The function of some or all of the apertures communicating with the water changes as a function of time due to rotor rotation. In this manner, the currents within the aquarium are ever changing. A number of variations and further embodiments are also possible and several examples are discussed in connection with particular embodiments as shown in the drawings and the following detailed description.

BRIEF DESCRIPTION OF THE DRAWINGS

FIG. 4a' is a perspective view of an aquarium having arrows indicating active water inputs corresponding to the position of the rotor as shown in FIG. 4a.

FIG. 4b' is a perspective view of an aquarium having arrows indicating active water inputs corresponding to the position of the rotor as shown in FIG. 4b.

FIG. 4c' is a perspective view of an aquarium having arrows indicating active water inputs corresponding to the position of the rotor as shown in FIG. 4c.

FIG. 10a' is a perspective view of an aquarium having arrows indicating active water flow ports of the aquarium corresponding to the position of the rotor shown in FIG. 10a.

FIG. 10b' is a perspective view of an aquarium having arrows indicating active water flow ports corresponding to the position of the rotor show in FIG. 10b.

FIG. 10c' is a perspective view of an aquarium having arrows indicating active water flow ports corresponding to the position of the rotor shown in FIG. 10c.

DETAILED DESCRIPTION OF THE PREFERRED EMBODIMENTS

The invention generally relates to a distributor for controlling water distribution.

Figure 1:
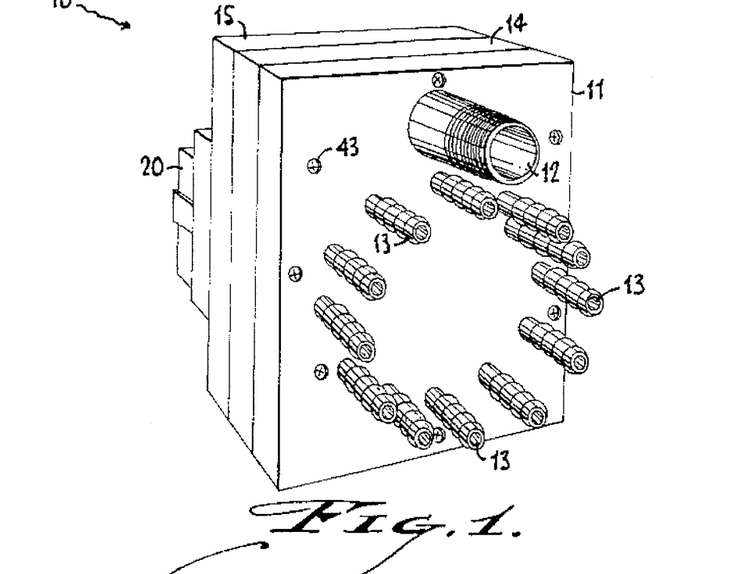
FIG. 1 is a perspective view of a preferred distributor according to the invention.
Figure 3:
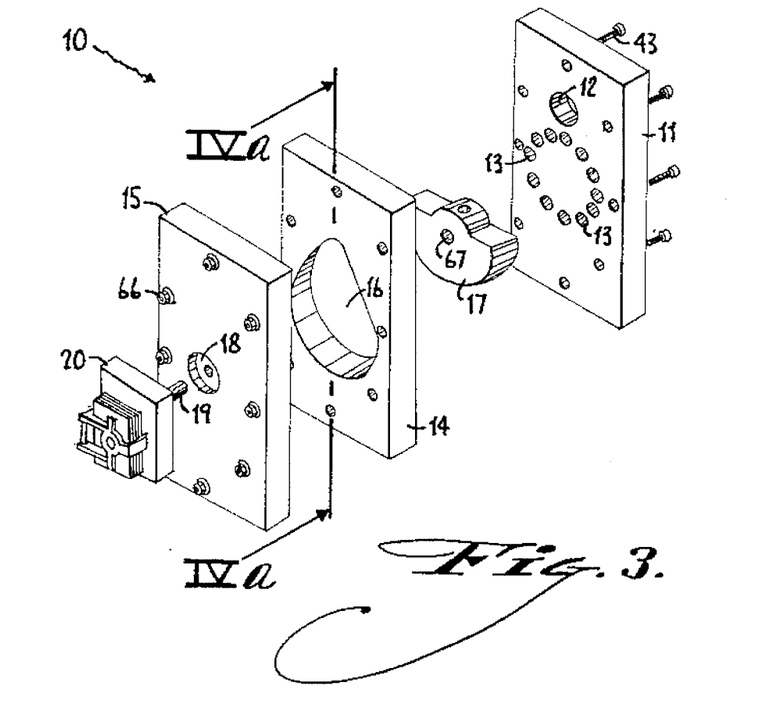
FIG. 3 is an exploded view of the distributor shown in FIG. 1.

Referring now to the numbered drawings, one embodiment of the distributor 10 is shown in FIGS. 1 and 3. Distributor 10 has front wall 11 traversed by a main pipe stem 12 and a plurality of secondary nozzles 13. A middle panel 14 is mounted between front wall 11 and back wall 15, and carries a movable rotor 17 in an internal opening communicating with the main pipe stem 12 and secondary nozzles 13. The rotor turns to control the coupling of secondary nozzles 13 to the main pipe stem 12 by covering or uncovering the secondary nozzles in the internal opening. When assembled, walls 11, 14 and 15 are held snugly together by screws 43 and nuts 66, forming a housing.

Each of walls 11, 14 and 15 are preferably of equal thickness. Middle wall 14 has an essentially tear shaped cut-out 16, for housing rotor 17, which defines a portion of a circle, and thus covers only a subset of the secondary nozzles 13. In the embodiment shown the rotor is semicircular and the secondary nozzles are evenly spaced in a circle, the rotor thus covering half of the secondary nozzles. The rotor 17 is rotationally fixed to shaft 19, extending through mounting hole 67 and turned by motor 20, which is mounted on back wall 15. Back wall 15 has shaft aperture 18 allowing passage of shaft 19.

During operation, water or some other liquid under pressure or suction, for example from a pump, is coupled through main pipe stem 12 to the chamber defined by tear-shaped cut out 16. Rotor 17 blocks a plurality of secondary nozzles 13, decoupling the blocked secondary nozzles from the main chamber, while at the same time coupling other secondary nozzles to the main chamber. Rotor 17 is preferably nearly the same thickness as middle wall 14, the clearance being only sufficient to allow rotor motion. In this manner, rotor 17 lies flush against the front wall 11 and back wall 15 preventing water flow between the faces of rotor 17 and either of front wall 11 or back wall 15 to effectively block a certain plurality of secondary nozzles 13.

Pressurized water may be applied to the main stem 12 by coupling the distributor downstream of a water pump. Due to the semi-circular shape of rotor 17, the water entering tear shaped cut out 16 from main pipe stem 12 exits through the secondary nozzles 13 which are unblocked. Secondary nozzles 13 are preferably coupled by tubing or the like to a number of distinct locations.

Rotor 17 is rotated slowly by shaft 19 of motor 20. As rotor 17 rotates, particular secondary nozzles 13 become blocked or unblocked, thereby producing flow through certain previously blocked secondary nozzles and stopping flow through previously blocked secondary nozzles. In this manner, water is distributed to the various distinct locations in a manner that varies over time. Motor 20 can be arranged to operate at any infinite variety of speeds and preferably is driveable at manually selectable speeds. A continuously variable speed control or a stepwise variable speed control can be coupled electrically to the motor for this purpose. Low speed operation, for example, at 1–10 revolutions per minute (RPM) is most useful for the preferred applications discussed herein.

According to one potential application of the invention, each of secondary nozzles 13 is coupled, for example by tubing or hose, to a sprinkler head in a farm field. Whereas constant watering in a limited area may overly saturate the ground and provide more water than can be used by the plants, the invention allows automatic selection of a subset of the sprinklers for a predetermined time, followed by selection of a different subset. In arid areas such as the farmlands of California, available water can be efficiently used. A single sprinkler head connected to a secondary nozzle will be active, i.e. delivering water, for a period of time determined by the rotation rate of shaft 19 and by the size/shape relationship of rotor 17 to the pattern of secondary nozzles, and these aspects of the distributor can be varied to suit the particular application desired. Water delivered via a given sprinkler while coupled to the main chamber has an opportunity to soak in and be absorbed by plant roots and the like.

Figure 2:
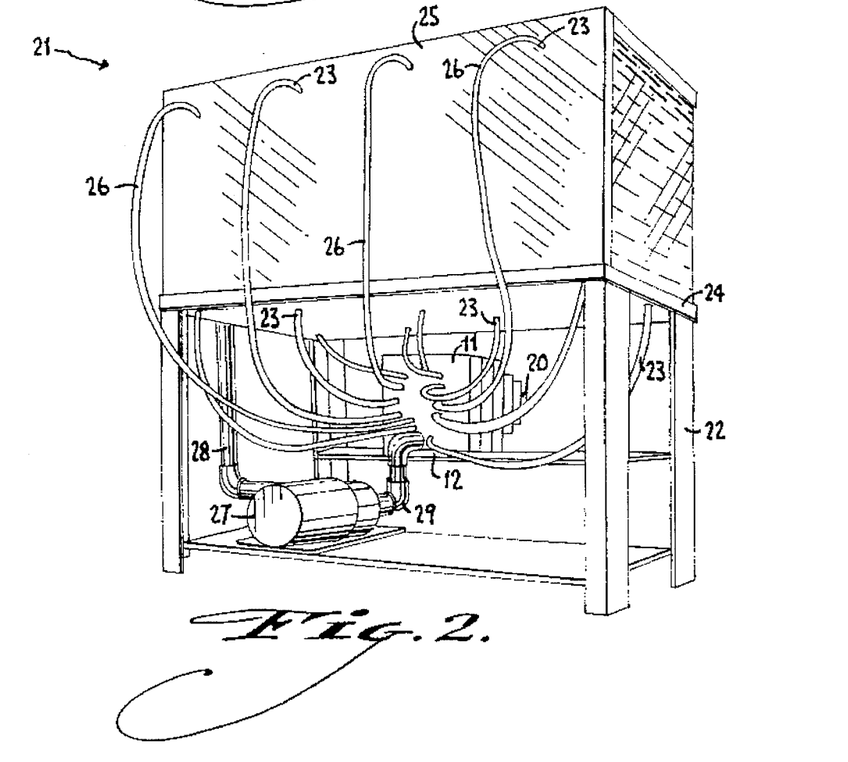
FIG. 2 is a perspective view showing the distributor coupled to distribute water to an aquarium.

Another preferred use for distributor 10 is to provide the time-varying water currents to an aquarium. Such use is depicted in FIG. 2. Aquarium 21, e.g., mounted on aquarium stand 22, has a plurality of ports 23 located, for example, in its bottom 24 and back 25. Ports 23 are coupled to secondary nozzles 13 located in front wall 11 of distributor 10 by tubing 26. It is also possible to arrange tubing to pass over the side walls of the tank, the open ends of the tubing being disposed at spaced locations in the water, instead of being coupled to ports passing through the tank walls.

Pump 27 has draw pipe 28 for drawing water from within aquarium 21. Water drawn from aquarium 21 by pump 27 is input to main pipe stem 12 of distributor 10 through pipe elbow 29. Water forced into main pipe stem 12 by pump 27 is dispersed to the aquarium through any unblocked secondary nozzles 13 and tubing 26 into corresponding ports 23 mounted in aquarium 21 or defined by tubing ends in the water. It is preferable to provide pump 27 with a variable flow rate.

In the embodiment shown, the ports couple to the water directly through the aquarium walls. In order to provide ports of this type, especially in aquarium back 25 and aquarium bottom 24, the back and bottom can be made of a non-corrosive metal which can be bored, such as stainless steel. Alternatively, the entire aquarium 21 can be made of a drillable acrylic plastic or ports 23 can be formed in the walls of aquarium 21 when molded. It is also possible, although not preferred, to cut holes in glass walls.

As noted above, depending upon the angular position of rotor 17 and the relative sizes of the rotor and the array of ports 23, a subset of ports 23 are coupled to aquarium 21 at any given time. In this manner, a certain current flow is developed within aquarium 21. As rotor 17 rotates, to unblock a previously blocked secondary nozzle and, concurrently, to block a previously unblocked secondary nozzle, a new water current pattern will develop within aquarium 21. This action continues as rotor 17 makes its rotations within tear shaped cut-out 16. The time-varying currents produced by distributor 10 are beneficial to the quality of the water within aquarium 21 and the health of any fish or plants living within aquarium 21. The time varying currents contribute to oxygenation of the water and prevent stagnation and its associated build up of toxic wastes and chemicals. Unlike an aquarium wherein at most a steady current may develop between an inlet and an outlet to a filter means, the currents according to the invention vary from time to time in a complex pattern, tending to achieve better overall oxygenation of the water throughout the aquarium.

Figure 4A:
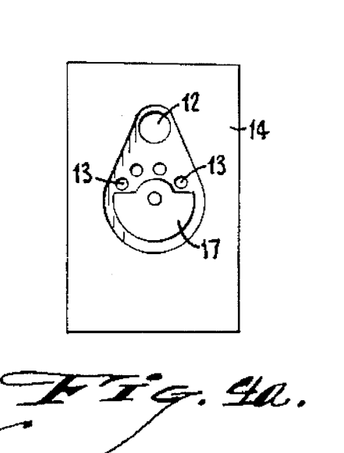
FIG. 4a is a section view taken along the lines IV—IV of FIG. 3 showing the rotor in one angular position.
Figure 4B:
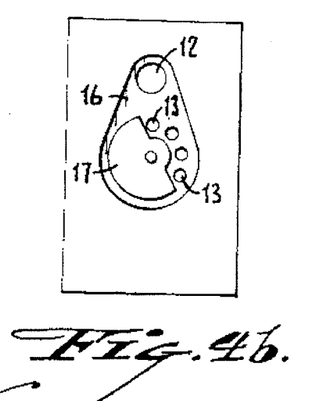
FIG. 4b is a section view taken along the lines IV—IV of FIG. 3 showing the rotor in another angular position.
Figure 4C:
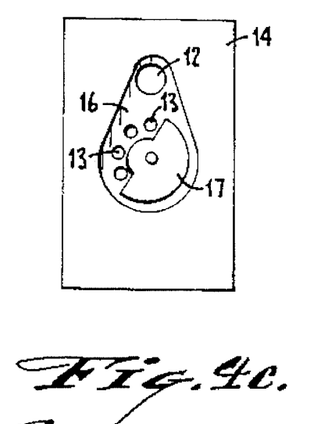
FIG. 4c is a section view taken along the lines IV—IV of FIG. 3 showing the rotor in another angular position.

The varying current action in aquarium 21, dependent upon rotor position, is illustrated by comparison of FIGS. 4a–4c'. In FIG. 4a, for example rotor 17 is shown blocking a number of secondary nozzles 13 residing in a lower portion of tear shaped cut-out 16. Four secondary nozzles 13 near the top of cut-out 16 remain unblocked. Water pumped in through main pipe stem 12 flows out unblocked secondary nozzles 13 through tubing 26 (not shown in FIGS. 4a–4c') to various ones of ports 23, depending on the tubing connections. For demonstration, the arrows in FIG. 4a' show which ports may be active, i.e., delivering water in that they are coupled to the unblocked secondary nozzles 13 shown in FIG. 4a. FIGS. 4b, 4b', 4c and 4c' depict similar action, however, with different ports 23 delivering water corresponding to different ones of secondary nozzles 13 being unblocked by rotor 17.

In the foregoing description of the operation of distributor 10 to control time-varying water currents in an aquarium 21, pump 27 draws water from aquarium 21 through draw pipe 28 and emits the water into distributor 10 through main pipe stem 12 for disbursement to the aquarium through secondary nozzles 13, tubing 26 and ports 23. Alternatively, pump 27 can be connected to provide suction, which is likewise distributed. Water is thereby drawn from pipe elbow 29 and pipe stem 12 to pull in water from selected ports 23, tubes 26 and secondary nozzles 13, depending on the position of rotor 17. Water drawn into distributor 10 is returned to aquarium 21 through draw pipe 28.

Other possible variations involving the use of distributor 10 in an aquarium setup as shown in FIG. 2 include the placement of filtering means in a water flow path coupled to the distributor. Preferably, the filtering means can be placed along the water flow path defined by draw-pipe 28 whereby water drawn from the aquarium is first filtered before being provided to distributor 10 for distribution back into the aquarium.

Figure 5:
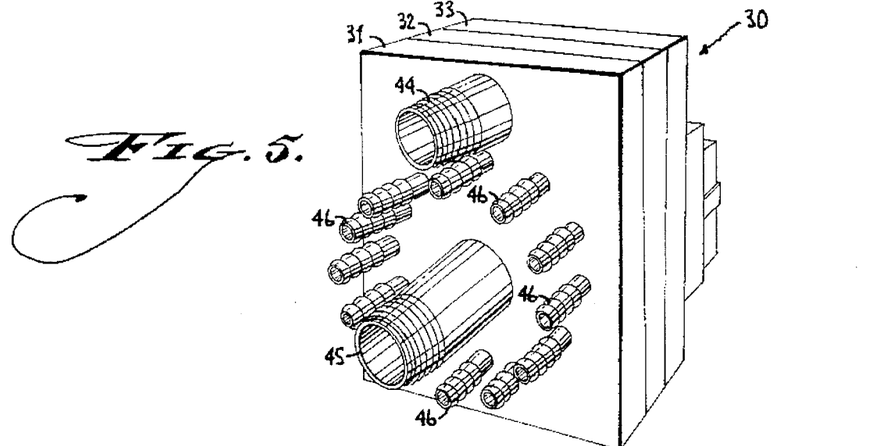
FIG. 5 is a perspective view of an alternate embodiment of the distributor according to the invention.
Figure 8:
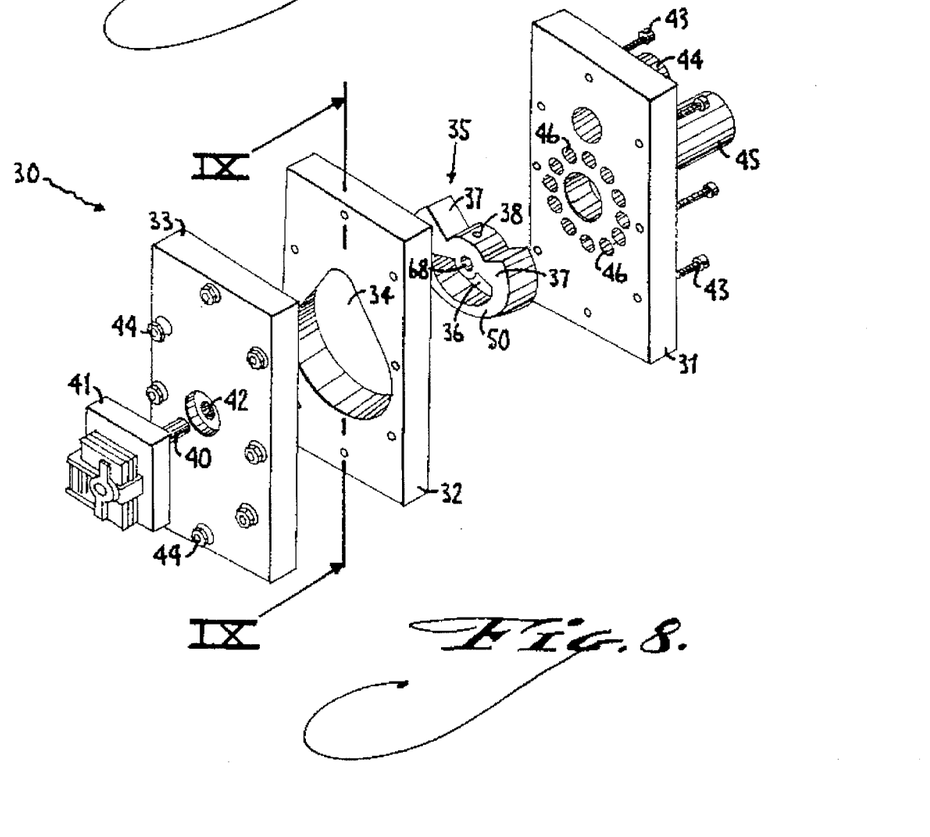
FIG. 8 is an exploded view of the distributor of FIG. 5.

An alternative version of the invention is shown in FIGS. 5 and 8. In FIGS. 5 and 8, distributor 30 has front wall 31, middle panel 32 and back wall 33. Preferably, each of walls 31, 33 and panel 32 are manufactured of a hard plastic and are of equal width. Middle panel 32 is sandwiched between front wall 31 and back wall 33. The middle wall 32 has tear shaped cut-out 34 which defines an open chamber for housing rotor 35. Rotor 35 has a peripheral boundary around a portion of 360°. Rotor 35 has an opening 36 defining a secondary chamber, wings 37, outer radius 38, inner-radius 39 and rotor boundary 50. Rotor 35 is mounted on shaft 40 of motor 41. Shaft 40 passes through shaft aperture 42 in back wall 33 and seats within mounting hole 68. Walls 31, 32 and 33 are held together by screws 43 and nuts 66.

Front wall 31 has input pipe stem 44 and output pipe stem 45. Front wall 31 also has a plurality of secondary nozzles 46. Input pipe stem 44, output pipe stem 45 and secondary nozzles 46 each provide passageways through front wall 31 to tear shaped cut-out 34 of middle wall 32.

Figure 7:
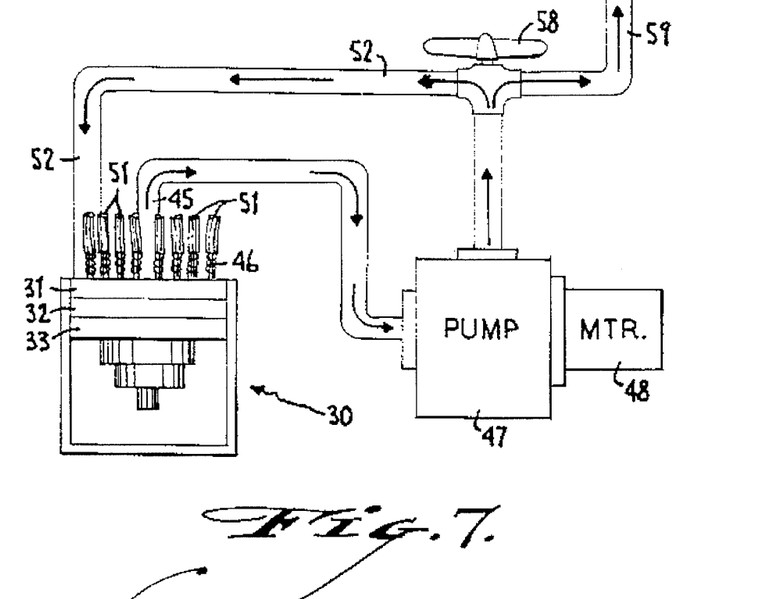
FIG. 7 is a schematic illustration of the plumbing connections of the distribution system of FIG. 6.
Figure 9:
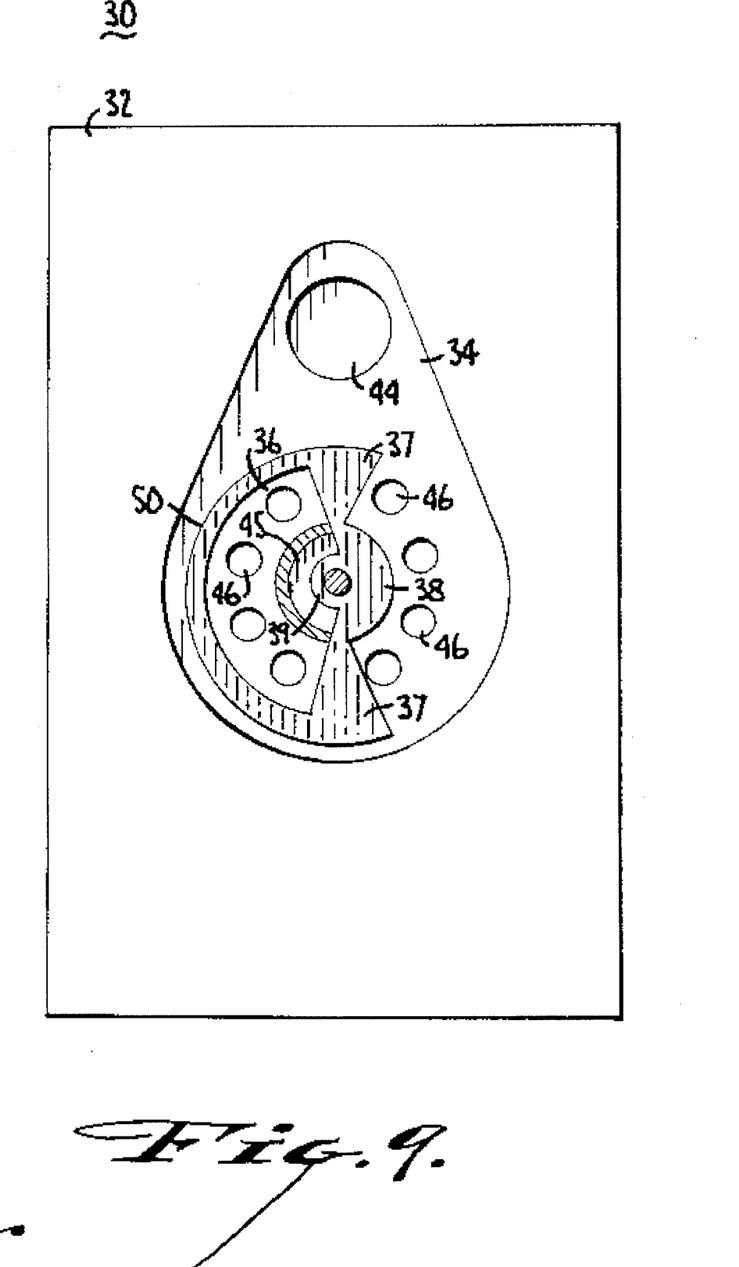
FIG. 9 is a section view taken along the lines IX—IX of FIG. 8.

With additional reference to FIGS. 7 and 9, pump 47 and motor 48 draw water through output conduit 49 from output pipe stem 45. Pump 47 preferably has a variable flow rate. Output pipe stem 45 communicates with the secondary nozzles 46 within opening 36 of rotor 35. Secondary nozzles 46 within opening 36 are isolated from the remainder of tear-shaped cut out 34 by the interface of wings 37 and rotor boundary 50 with back wall 33 and front wall 31. For this reason, it is important to provide rotor 35 with a thickness essentially equal to the thickness of middle wall 32 to ensure a tight fit between rotor 35 and each of front wall 31 and back wall 33. This will prevent water flow between the faces of rotor 35 and either of front wall 31 or back wall 33, bypassing the desired route. Radius 38 of rotor 35 is larger than radius 39. Outer radius 38 partially blocks output pipe stem 45 whereby output pipe stem 45 opens into tear shaped cut out 34 only in opening 36. Secondary nozzles 46 are coupled by tubing 51 to a tank such as an aquarium. The suction of pump 47 on output pipe stem 45 through output conduit 49 pulls liquid in through certain of tubes 51 connected to the secondary nozzles 46 residing within opening 36.

Water pulled into pump 47 is pumped out of pump 47 through output conduit 52. Output conduit 52 is coupled to input pipe stem 44 mounted on front wall 31 of distributor 30. Liquid provided to input pipe stem 44 flows into tear shaped cut out 34. Tear shaped cut out 34 communicates with certain secondary nozzles 46, i.e., those not blocked by wings 37 or residing within opening 36. Water thus flows from input pipe stem 44 to the communicating secondary nozzles 46. Secondary nozzles 46 are coupled to the tank of liquid through tubing 51. It can be seen, therefore, that at a given time liquid is being drawn from the tank through various apertures and replaced back into the tank through other apertures, the selection of which varies over time.

Rotor 35 is rotated within tear shaped cut out 34 by motor 41. Accordingly, as rotor 35 rotates, different ones of secondary nozzles 46 fall within opening 36, or are blocked by wings 37, or are external to rotor 35 and in communication with input pipe stem 44. Accordingly, the functions of the secondary nozzles, i.e., drawing water in, pumping water out or inactive change from time to time as a function of the position of rotor 35. The rate of change of the action of secondary nozzles 46 depends on the speed of rotation of rotor 35, the width of wings 37 and the layout of the apertures themselves. For handling larger volumes of water, it is preferable that opening 36 of rotor 35 have a volume equal to at lease one-forth (¼) of the volume of tear shaped cut-out 34.

The relative positioning and functioning of input pipe stem 44 and output pipe stem 45 are reversible. For example, as disclosed above, water or some other liquid is pumped into input pipe stem 44 for distribution out of selected ones of secondary nozzles 46 not blocked by wings 34 or residing within opening 36 of rotor 35. Water is drawn from output pipe stem 45 through selected ones of secondary nozzles residing within opening 36 of rotor 35. However, the operation of the distributor 30 need not be so limited. Water can be drawn out of pipe stem 44, traveling through selected ones of secondary nozzles 46 not blocked by wings 34 or residing within opening 36 of rotor 35. Correspondingly, water can be pumped into pipe stem 45 for distribution out of selected ones of secondary nozzles residing within opening 36 of rotor 35. Therefore, depending on the particular manner of connection of distributor 30, water drawn out of distributor body 30 through a pipe stem first enters distributor body 30 through secondary nozzles connected with either of opening 36 or tear-shaped cut out 34. Water pumped into distributor body 30 through the remaining pipe stem exits distributor body 30 through secondary nozzles connected to the other of the opening 36 or tear-shaped cut out 34.

Figure 6:
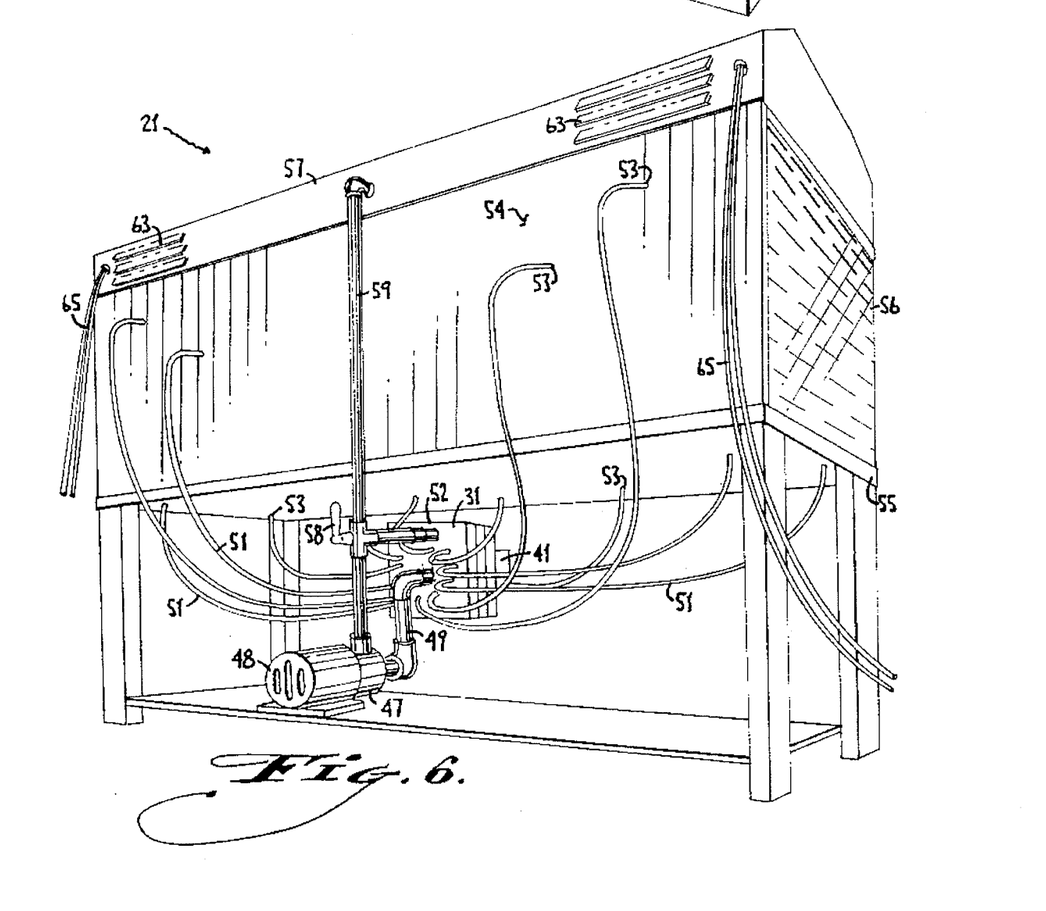
FIG. 6 is a perspective view of the distributor of FIG. 5 installed for water distribution within an aquarium.

A further use for distributor 30 is depicted in FIG. 6. In this embodiment, secondary nozzles 46 are coupled to various ports 53 on back 54 and bottom 55 of aquarium 56. Aquarium 56 has aquarium hood 57, discussed in detail below. Depending on the position of rotor 35, certain ports 53 coupled to secondary nozzles 46 are drawing water from the aquarium, others are emitting water into the aquarium and still others are doing neither. This action tends to set up a current flow within the aquarium 56, and as discussed, the flow varies in direction as rotor 35 turns in its chamber. The result is an environment of varying current conditions, providing more natural conditions for aquarium life and tending to better oxygenate and purify the water.

Figure 10A:
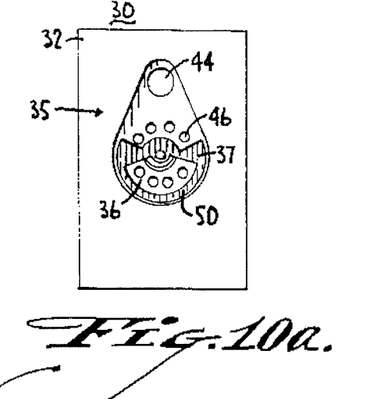
FIG. 10a is a section view taken along the lines IX—IX of FIG. 8 showing an angular position of the rotor.
Figure 10B:
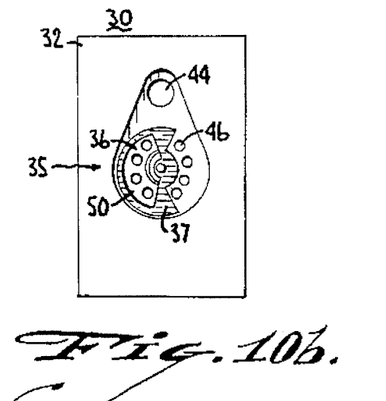
FIG. 10b is a section view taken along the lines IX—IX of FIG. 8 showing another angular position of the rotor.
Figure 10C:
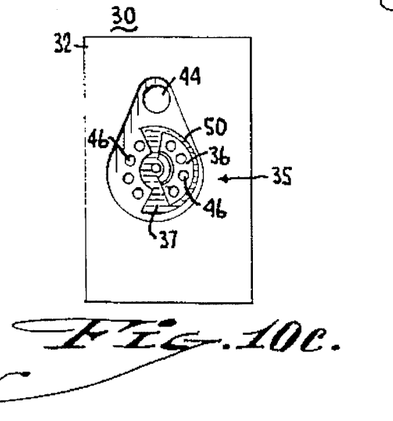
FIG. 10c is a section view taken along the lines IX—IX showing yet another angular position of the rotor.

FIGS. 10a–10c' depict water action within aquarium 56 relative to different positions of rotor 35 of distributor 30. For example, the arrows of FIG. 10a' show the direction of water relative to ports 53. Arrows pointing into aquarium 56 are streams of water being emitted into the aquarium; arrows pointing out of aquarium 56 are streams of water being drawn from the aquarium. The direction of water flow shown in FIG. 10a' corresponds to the position of rotor 35 shown in FIG. 10a, and similarly as to FIGS. 10b, 10b' and 10c, 10c', respectively.

Distributor 30 when coupled to aquarium 56 as shown in FIG. 6 provides a realistic environment for marine life by producing time varying currents and eddies within aquarium 56. Distributor 30 can emulate regular natural currents such as are produced in flowing streams and rivers, tidal currents, etc. It is also possible to emulate other aspects of nature, such as wind, rain and sunlight to control and change the environment in aquarium 56. This is accomplished through hood 57, shown in FIG. 6 and more fully in FIGS. 11–13.

Figure 11:
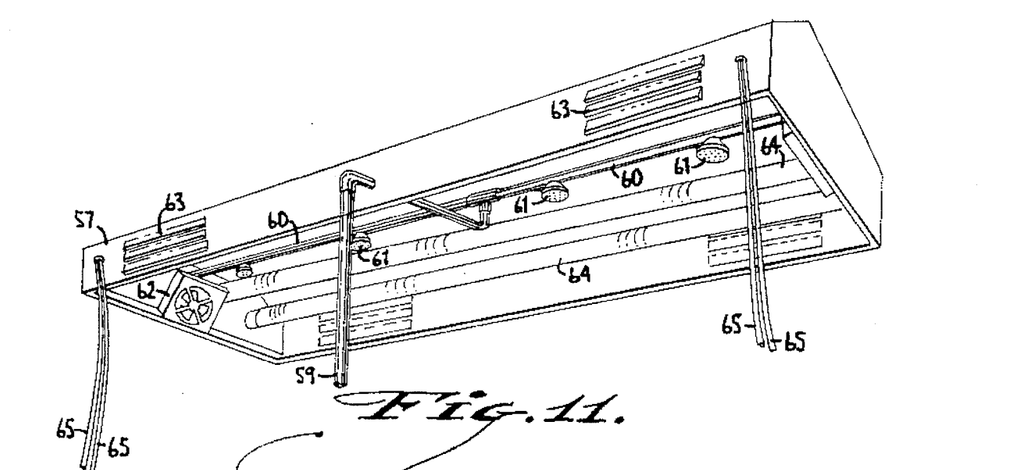
FIG. 11 is a perspective view of a preferred aquarium hood according to the invention.
Figure 12:
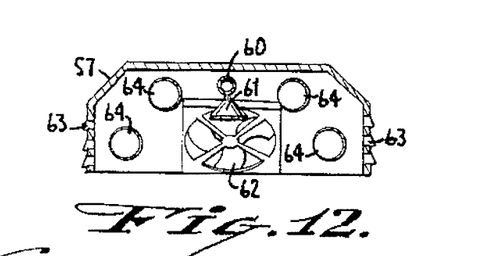
FIG. 12 is a transverse section view of the aquarium hood.
Figure 13:
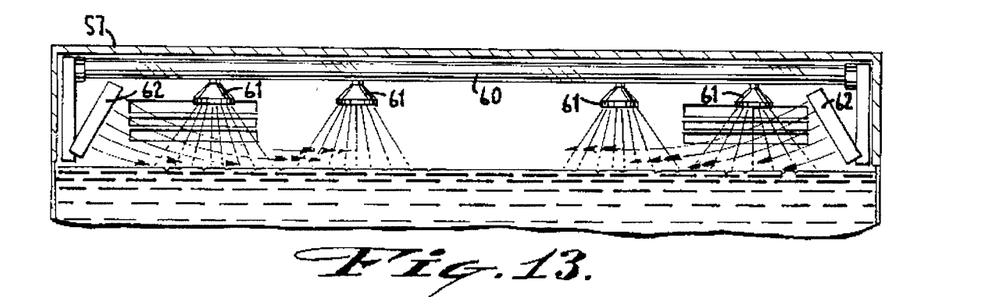
FIG. 13 is a longitudinal section view of the aquarium hood.

Referring first to FIG. 6, diverter valve 58 can be rotated to divert water from input conduit 52 to rain pipe 59. Shut-off valve 58 may completely divert the flow of water from input conduit 52, thereby completely depriving input pipe stem 44 of water or may only divert some of the water from input conduit 52 and input pipe stem 44 to rain pipe 59. Referring now to FIGS. 11–13, water pumped up through rain pipe 59 travels into hood pipe 60. Hood pipe 60 is coupled to sprinkler heads 61. Sprinkler heads 61 provide a spray of water to the water in aquarium 56 to simulate rain. The water diverted to rain pipe 59 and eventually sprinkler heads 60 is drawn from aquarium 56 through those of ports 53 coupled to secondary nozzles 46 within open chambers 36 of rotor 35. The ports 53 actually drawing water change as rotor 35 turns, in the same manner as discussed above. Accordingly, currents are still flowing within aquarium 56 as water is drawn out through ports 53 by pump 47. The water drawn out is returned to the tank through diverter valve 58, rain pipe 59 and sprinkler heads 61, the spray aspect providing additional exposure of the water to oxygen.

It is also possible to provide wind across the surface of water within aquarium 56. The wind can be provided along with rain from sprinkler hood 61, for instance to simulate a storm. Wind is provided by electric fans 62 mounted at each end of aquarium hood 57. Vents 63 are provided in aquarium hood 57 to prevent build-up of positive air pressure within aquarium hood 57.

Lighting for aquarium 56 can be provided and controlled to illuminate the marine life within and also to provide the marine life with a simulation of daylight and nighttime. Illumination is accomplished by mounting fluorescent tube lighting 64 within hood 57. An operator or a timed controller can switch-on tube light 64 to simulate daylight hours and switch-off tube light 64 to simulate nighttime. Electric cords 65 provide necessary electric power to fans 62 and tube lights 64.

Any of the environment simulating devices of the invention, i.e. distributor 30, lights 64, fan 62 or sprinkler head 61 can be used along or in conjunction with another to provide the desired realism. For example, motor 41 can be shut-off to eliminate most or all of the water currents within aquarium 56. Lights 64 can be shut-off, fans 62 can be shut-off and sprinkler heads 61 can provide a gentle rainfall within aquarium 56 to simulate a gentle shower within aquarium 56, or alternatively all the devices, for example distributor 30, fans 62 and sprinkler head 61 can be activated at full power to simulate a more violent storm.

While specific embodiments of the invention have been described in detail, it will be appreciated that those skilled in the art will now be aware of various modifications and alternatives to the foregoing preferred embodiments in light of the overall teachings of this disclosure. For example, twelve secondary nozzles 13, 46 are depicted in each of distributor 10 and distributor 30, arranged circularly and covered or uncovered by one rotating rotor. It is possible to provide each distributor with more or fewer secondary nozzles, to arrange them other than circularly, and/or to employ a different form of movable covering rotor, e.g., reciprocating. It is possible to provide variable controls to fan 62 and lights 64 to control the intensity of the light and wind within aquarium hood 57. Diverter valve 58 can be only partially opened to limit the flow of water to sprinkler heads 61 while allowing the remainder of the water to enter distributor 30 through input pipe stem 44 for distribution out certain secondary nozzles 46, etc.

The sides or bottom of the aquarium traversed by the ports as described should be constructed of stainless steel or acrylic. It is possible, actually, to manufacture the sides of the aquarium housing the ports of any material which can accept the ports without degrading the integrity of the aquarium, or to couple the ports to the water by conduits which pass over rather than through the aquarium walls. Accordingly, the particular arrangements disclosed are meant to be illustrative only and not limiting as to the scope of the invention which is to be given the full breadth of the appended claims and any and all equivalent thereof.

What I claim is:

1. A fluid distribution valve, comprising:

a distributor body having an open chamber within said distributor body, said chamber having a volume;

an input pipe stem providing a passageway through said distributor body to said open chamber;

an output pipe stem providing a passageway through said distributor body to said open chamber;

a plurality of secondary nozzles arranged in at least one circle, said secondary nozzles providing a plurality of passageways through said distributor body to said open chamber;

a rotor disposed in said chamber, said rotor having a peripheral boundary extending around a portion of 360°, the rotor being hollow within said boundary thereby defining a secondary chamber, said rotor having a contact section for movably sealing a wall of the chamber at the secondary nozzles, the secondary chamber connecting with at least two of said plurality of secondary nozzles, said secondary chamber having a volume of at least one-fourth of the volume of said open chamber;

pump means comprising at least one pump for forcing fluid into said input pipe stem, said fluid forced into the input pipe stem exiting the distributor body through at least two of the secondary nozzles connected with one of the open chamber or secondary chamber, and for drawing water out of the distributor body through said output pipe stem, said water drawn out of the distributor body first entering the distributor body through secondary nozzles connected with the other of said open chamber or secondary chamber;

a motor operable to move said rotor, wherein various ones of said plurality of secondary nozzles are brought into connection with said secondary chamber as others of said secondary nozzles become isolated from said secondary chamber, said secondary nozzles cyclically connecting with and becoming isolated from said secondary chamber as a function of rotor motion.

2. The distribution valve of claim 1, wherein said rotor is essentially semi-circular.

3. The distribution valve of claim 1, further comprising a plurality of conduit means, said conduit means coupling said secondary nozzles to fluid reservoir.

4. The distribution valve of claim 3, wherein said fluid reservoir is a water-filled tank.

5. The distribution valve of claim 1, wherein said chamber is defined by a middle wall disposed between two end walls, the middle wall having a thickness and a cutout section, said rotor having opposing faces spaced essentially equal to said thickness of said middle panel wherein a sealing fit is established between each of said opposing faces and said end walls to prevent fluid transfer between said secondary chamber and said chamber.

6. A fluid distribution valve, comprising:

a distributor body having a from wall and a back wall and means defining a chamber between the front and back walls;

an input pipe stem providing a passageway through said front wall to said chamber;

an output pipe stem providing a passageway through said front wall to said chamber;

a plurality of secondary nozzles arranged in at least one circle on said front wall, said secondary nozzles providing a plurality of passageways through said distributor body to said chamber, one of said input pipe stem and output pipe stem being positioned within said at least one circle defined by said secondary nozzles, the other of said input pipe stem and output pipe stem being positioned outside the circle;

a rotor disposed in the chamber, the rotor having a contact portion for movably sealing a wall of the chamber at the secondary nozzles and the rotor having an opening for connecting with at least one of said plurality of secondary nozzles wherein others of said secondary nozzles are blocked by said contact portion or isolated from said opening and connecting with said chamber;

pump means comprising at least one pump for forcing fluid into said input pipe stem, said fluid exiting the distributor body through at least one of the secondary nozzles connected with one of the chamber or opening, and for drawing water out of the distributor body through said output pipe stem, said water first entering the distributor body through secondary nozzles connected with the other of said chamber or opening;

a motor mounted on an outside face of said back wall operable to move said rotor, whereby various ones of said plurality of secondary nozzles are brought into connection with said opening as others of said secondary nozzles become connected with said chamber, said secondary nozzles cyclically connecting with and become isolated from said opening as a function of rotor motion.

7. The distribution valve of claim 6, wherein said rotor has a peripheral boundary extending around a portion of 360°.

8. The distribution valve of claim 7, wherein said rotor is essentially semi-circular.

9. The distribution valve of claim 6, further comprising a plurality of conduit means, said conduit means coupling said secondary nozzles to a fluid reservoir.

10. The distribution valve of claim 6, wherein said chamber is defined by a middle wall disposed between said front and back walls, said middle wall having a thickness and a cutout section, said rotor having opposing faces spaced essentially equal to a thickness of said middle wall wherein a sealing fit is established between each of said opposing faces and said front and back walls to prevent fluid transfer between said chamber and said rotor opening.

11. The distribution valve of claim 6, wherein said back wall has an aperture, said motor having a shaft passing through said aperture, said rotor mounted to said shaft for rotation by said motor.

* * * * *